United States Patent
Christoffersson et al.

(10) Patent No.: US 9,167,535 B2
(45) Date of Patent: Oct. 20, 2015

(54) METHOD AND APPARATUS FOR UPLINK TRANSMIT POWER ADJUSTMENT

(75) Inventors: Jan Christoffersson, Luleå (SE); Mårten Ericson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 223 days.

(21) Appl. No.: 13/880,808

(22) PCT Filed: Oct. 28, 2010

(86) PCT No.: PCT/SE2010/051171
§ 371 (c)(1),
(2), (4) Date: Apr. 22, 2013

(87) PCT Pub. No.: WO2012/057663
PCT Pub. Date: May 3, 2012

(65) Prior Publication Data
US 2013/0230008 A1    Sep. 5, 2013

(51) Int. Cl.
| | |
|---|---|
| *H04W 4/00* | (2009.01) |
| *H04W 52/22* | (2009.01) |
| *H04B 7/04* | (2006.01) |
| *H04B 7/06* | (2006.01) |
| *H04W 52/14* | (2009.01) |
| *H04W 52/42* | (2009.01) |
| *H04W 52/54* | (2009.01) |
| *H04W 72/04* | (2009.01) |
| *H04B 17/12* | (2015.01) |

(52) U.S. Cl.
CPC .......... *H04W 52/221* (2013.01); *H04B 7/0465* (2013.01); *H04B 7/0617* (2013.01); *H04W 52/146* (2013.01); *H04W 52/42* (2013.01); *H04B 17/12* (2015.01); *H04W 52/54* (2013.01); *H04W 72/046* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2002/0001292 | A1* | 1/2002 | Miyamoto | ............... 370/335 |
| 2006/0098759 | A1* | 5/2006 | Tiedemann et al. | ......... 375/297 |

(Continued)

FOREIGN PATENT DOCUMENTS

| | | |
|---|---|---|
| WO | 2011017464 A2 | 2/2011 |
| WO | 2011043720 A1 | 4/2011 |
| WO | 2011053220 A1 | 5/2011 |

OTHER PUBLICATIONS

3rd Generation Partnership Project. "UL Tx Diversity for HSPA—System simulation results for antenna switching." 3GPP TSG RAN WG1 Meeting #60bis, R1-101801, pp. 1-13, Apr. 12-16, 2010, Beijing, China.

(Continued)

*Primary Examiner* — Brandon Renner
*Assistant Examiner* — Manuel Rangel
(74) *Attorney, Agent, or Firm* — Murphy, Bilak & Homiller, PLLC (57) ABSTRACT

The present invention relates to a method and a user equipment for use in a wireless communication system. The method and user equipment allow for transmit power adjustment of the transmit power of a selected of a plurality of antennas of the user equipment. The method comprised a transmit power adjustment phase during which it is test (23) is performed to decrease the transmit power of the selected antenna. A number of TPC commands are then analyzed (24) to determine a result of the decreased transmit power indicating a change in received power at a base station. Based on the determined result it is decided to continue (27) with the decreased transmit power or to resume (26) the previous transmit power of the selected antenna after completion of the transmit power adjustment phase.

22 Claims, 5 Drawing Sheets

(56) References Cited

U.S. PATENT DOCUMENTS

| | | | | |
|---|---|---|---|---|
| 2006/0246936 | A1* | 11/2006 | Gross et al. | 455/522 |
| 2008/0181328 | A1* | 7/2008 | Harel et al. | 375/267 |
| 2009/0280857 | A1* | 11/2009 | Batra et al. | 455/522 |
| 2010/0002596 | A1* | 1/2010 | Wu | 370/252 |
| 2010/0266063 | A1 | 10/2010 | Harel et al. | |
| 2010/0273520 | A1* | 10/2010 | Pelletier et al. | 455/522 |
| 2011/0044296 | A1* | 2/2011 | Zhang et al. | 370/336 |

OTHER PUBLICATIONS

3rd Generation Partnership Project. "UL Tx Diversity for HSPA—System simulation results for antenna beamforming." 3GPP TSG RAN WG1 Meeting #60bis, R1-101802, pp. 1-13, Apr. 12-16, 2010, Beijing, China.

3rd Generation Partnership Project. "Multi-Antenna Uplink Transmission for LTE-A." TSG-RAN WG1 #56, R1-090794, Feb. 9-13, 2009, Athens, Greece.

3rd Generation Partnership Project. "Power control for multi-antenna transmission." 3GPP TSG-RAN WG1 #62bis, R1-105560, Oct. 11-15, 2010, pp. 1-11, Xi'an, China.

3rd Generation Partnership Project. "Uplink Power Control for Multi-antenna Transmission." 3GPP TSG RAN WG1 Meeting #62bis, R1-105431, Oct. 11-15, 2010, pp. 1-8, Xian, China.

3rd Generation Partnership Project. "UL-MIMO with Antenna Gain Imbalance." TSG-RAN WG1 #55bis, R1-090327, Jan. 12-16, 2009, pp. 1-6, Ljubljana, Slovenia.

* cited by examiner

METHOD AND APPARATUS FOR UPLINK TRANSMIT POWER ADJUSTMENT

TECHNICAL FIELD

The present invention relates to uplink transmit power adjustment in a wireless communications system, and in particular to methods and arrangements for transmit power adjustments in connection with uplink transmit diversity.

BACKGROUND

In communication systems based on e.g. Code Divisional Multiple Access (CDMA), power control is used to meet the desired quality of service targets. The power control may be implemented both in a user equipment (UE) to meet a downlink quality target and also in a base station (BS) to meet an uplink quality target. In wireless communication networks, the downlink (DL) is the transmission path from the base station to the user equipment, and the uplink (UL) is the transmission path from the user equipment to the base station. It is important that the power control is able to maintain the desired quality of service target despite varying radio conditions, which is often the case in wireless communication systems.

Most CDMA systems, such as cdma 2000, Wideband Code Division Multiple Access (WCDMA), and the extensions of WCDMA called High Speed Packet Access (HSPA) and Evolved HSPA (HSPA+) applies inner loop power control and outer loop power control. The inner loop power control, also called fast power control, runs every time slot, which is typically less than 1 ms (e.g. 0.67 ms in WCDMA). In WCDMA the inner loop power control runs in both uplink and downlink. The fast inner-loop power control adjusts the transmit power of the sender towards a specific Signal to Interference and noise Ratio (SIR) target at the receiver. The aim of the uplink and downlink inner loop power controls is to counter the effect of fast fading, while maintaining the desired SIR target. In the uplink the power control also compensates for the near-far problem, so that a signal received from users far out in a cell are not swamped out by stronger signals from users close to the base stations. During every slot the user equipment estimates the SIR on some known reference or pilot symbols and compares it with some SIR target corresponding to a given service, e.g. Block Error Rate (BLER), certain Bit Error Rate (BER) requirements and spreading factor used etc. In WCDMA, downlink SIR is measured on Dedicated Physical Control Channel (DPCCH), which comprises pilots bits and Transmit Power Control (TPC) bits. The TPC bits, which correspond to TPC commands, are also used for uplink power control and the pilot bits are primarily used for channel estimations. If the estimated SIR is less than the SIR target then the user equipment generates an UP command, otherwise it generates a DOWN command. In response the base station will increase (in case of UP) or decrease (in case of DOWN) its downlink transmit power. TPC commands for uplink power control are carried on Dedicated Physical Channel (DPCH) or Fractional DPCH (F-DPCH) from the base station to the user equipment. The user equipment will increase (in case of UP) or decrease (in case of DOWN) its uplink transmit power in response to the received TPC commands.

The aim of the outer loop power control is to adjust the SIR target value used by the inner loop power control as previously explained, while maintaining a certain link quality. The quality target (e.g. BLER of the data) is set by the network and is expected from the user equipment to consistently maintain this target to ensure the desired quality of service is met throughout the session. Due to the varying radio link conditions e.g. user mobility, fast fading etc, the mapping between the SIR target and BLER changes over time. This is a key point as it requires frequent adjustment of the SIR target to maintain the desired value of BLER. This mechanism of adjusting the SIR target is also referred to as outer loop power control, quality control or outer loop scheme.

The transmission of data over the air in a wireless communication system is performed by using a plurality of different physical channels, for example Dedicated Physical Control CHannel (DPCCH), Dedicated Physical Data CHannel (DP-DCH), Enhanced Dedicated Physical Control CHannel (E-DPCCH) and Enhanced Dedicated Physical Data CHannel (E-DPDCH). The power consumptions of these are generally related to each other by power offsets, i.e. beta-values or gain factor relative the power level of the DPCCH.

Currently the Third Generation Partnership Project (3GPP) is evaluating the potential benefits of uplink transmit (Tx) diversity in the context of High-Speed Uplink Packet Access (HSUPA). An aim is to enhance uplink capacity and UE power consumption. With uplink transmit diversity UEs that are equipped with two or more transmit antennas are capable of utilizing all of them for uplink transmissions. This is achieved by multiplying a UE output signal s(t) with a set of complex pre-coding weights $w_i$, where i=1 . . . N with N denoting the number of transmit antennas. The rationale behind uplink transmit diversity is to adapt the pre-coding weights so that user and network performance is maximized. Depending on UE implementation the antenna weights may be associated with different constraints.

Within 3GPP two classes of transmit diversity are considered:
  Switched antenna transmit diversity, where the UE at any given time-instance transmits from one of its antennas only. Thus if $w_i \neq 0$, $w_j = 0$ for all $j \neq i$.
  Beamforming where the UE at a given time-instance can transmit from more than one antenna simultaneously. By means of beamforming it is possible to shape an overall antenna beam in the direction of a target receiver.

While switched antenna transmit diversity is possible for UE implementations with a single power amplifier (PA) the beam forming solutions may require one PA for each transmit antenna.

Switched antenna transmit diversity can be seen as a special case of beamforming where one of the antenna weights is 1 (i.e. switched on) and the antenna weight of any other antenna of the UE is 0 (i.e. switched off).

A fundamental idea behind uplink transmit diversity is to exploit variations in the effective channel to improve user and network performance. The term effective channel here incorporates effects of transmit antenna(s), transmit antenna weights, receiving antenna(s), as well as the wireless channel between transmitting and receiving antennas.

A commonly considered application scenario of beamforming is a UE with two PAs that typically transmits with equal power on two antennas. Beamforming algorithms proposed in 3GPP use phase differences between the antennas based on a code book, which means that the phase difference is chosen among a set of possible phases. One algorithm to find the best phase difference discussed in 3GPP is to evaluate the effect of changing phase by examining the received TPC bits. For example, if the phase difference is increased and the corresponding TPC bits indicate that power should be increased, this implies that the increased phase difference resulted in worse channel and consequently, the phase should be restored or decreased.

The gain from using beamforming originates from the diversity gain that is obtained by using two or more transmit antennas. The increased gain means that lower transmission power is needed to reach the desired SIR target. In an interference limited system, the lower transmission power results in lower interference between cells (inter-cell interference), which may lead to higher cell throughput. For a power limited UE, the diversity gain is more or less directly shown as a coverage gain.

Channel conditions can differ a lot between different transmit antennas. There are two major reasons for this: fast fading differences between the antennas, and fixed antenna gain imbalance between the antennas. For a high speed user the difference between the antenna channels vary very fast, but for a stationary lap-top the channel differences can be more or less constant (or very slow varying). It is also common that a primary antenna has a better antenna gain than a secondary antenna. In the current 3GPP evaluations of UL Tx diversity, a fixed imbalance between two transmit antennas of 0 or 4 dB and a random (per UE) imbalance with standard deviation of 2.25 dB are being studied. Hence, it is not uncommon or unrealistic that there is a large antenna gain imbalance between the antennas.

From the above description it is apparent that there are many factors that may need to be considered in order to achieve efficient power control both in the downlink and in the uplink.

SUMMARY

An object of the present invention is to provide a method and apparatus for transmit power adjustment in connection with uplink transmit diversity.

The above stated object is achieved by means of a method and a user equipment according to the independent claims.

A first embodiment provides a method for transmit power adjustment in a user equipment of a wireless communications system. The method comprises performing uplink transmission by means of beamforming, which means that simultaneous uplink transmission from a plurality of antennas of the user equipment is carried out. The method further comprises performing a first transmit power adjustment phase. The first transmit power adjustment phase includes decreasing the transmit power of a selected antenna by a selected decrease amount during a first measurement period. The transmit power of the selected antenna, prior to the decrease, was lower than or equal to the transmit power of another antenna of the plurality of antennas. The first transmit power adjustment phase also includes analyzing a number of transmit power control, TPC, commands corresponding to the first measurement period to determine a result of the decreased transmit power of the selected antenna, indicating a change in received power at a base station. If the result of the decreased transmit power is above or equal to a decrease threshold value, then the first transmit power adjustment phase is completed and the transmit power of the selected antenna prior to the decrease by the decrease amount is resumed. On the other hand, if the result of the decreased transmit power is below the decrease threshold value, then the first power adjustment phase is completed and the uplink transmission continues with the decreased transmit power of the selected antenna.

A second embodiment provides a user equipment for use in a wireless communication system. The user equipment comprises a plurality of antennas adapted for simultaneous uplink transmission and transmit power control circuits configured to control the transmit power of the plurality of antennas. The transmit power control circuits are configured to perform a first transmit power adjustment phase. The first transmit power adjustment phase includes decreasing the transmit power of a selected antenna by a selected decrease amount during a first measurement period. The transmit power of the selected antenna prior to the decrease was lower than or equal to the transmit power of another antenna of the plurality of antennas. The first transmit power adjustment phase also includes analyzing a number of received transmit power control, TPC, commands corresponding to the first measurement period to determine a result of the decreased transmit power of the selected antenna, indicating a change in received power at a base station. If the result of the decreased transmit power is above or equal to a decrease threshold value, then the first transmit power adjustment phase is completed and the transmit power of the selected antenna is controlled to resume the transmit power of the selected antenna prior to the decrease by the decrease amount. On the other hand, if the result of the decreased transmit power is below the decrease threshold value, then the first power adjustment phase is completed and the transmit power of the selected antenna is controlled to continue uplink transmission with the decreased transmit power of the selected antenna.

An advantage of the embodiments described above is that they may allow for decreased power usage in case of uplink beamforming with one or several inferior antennas and/or differing channel conditions for different antennas.

Further advantages and features of embodiments of the present invention will become apparent when reading the following detailed description in conjunction with the drawings.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

As used herein the term "antenna" is interchangeable with the term "antenna element". Therefore when referring herein to a user equipment with multiple antennas this includes user equipment's with a multiple element antenna arrangement.

Figure 1:
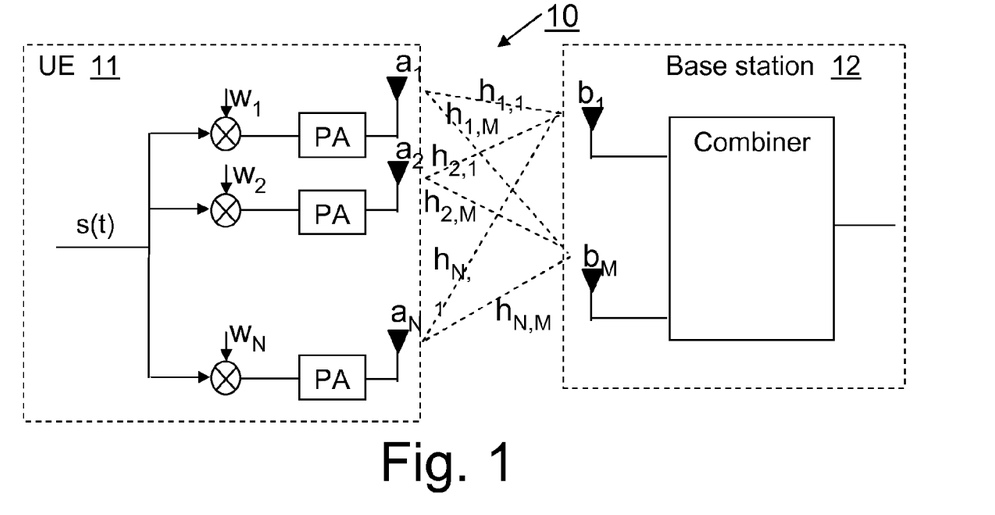
FIG. 1 is a schematic block diagram illustrating transmit and receive diversity in the uplink in general.

FIG. 1 is a schematic block diagram illustrating transmit and receive diversity in the uplink in general. A user equipment (UE) 11 comprises a plurality of transmit antennas $a_1$, $a_2, \ldots, a_N$ from which an input signal s(t) may be transmitted to a base station 12. Transmission antenna weights $w_1$, $w_2, \ldots, w_N$ are used to control the transmit diversity. If the transmission antenna weights are set in such a way that the input signal s(t) is transmitted from a plurality of antennas simultaneously this is called beamforming, as mentioned above. The transmissions from the transmit antennas $a_1$, $a_2, \ldots, a_N$ are received by receive antennas $b_1, \ldots, b_M$ of the base station 12 and fed to a combiner. As illustrated in FIG. 1, when both transmit and receive diversity is applied, there exist a plurality of different channels (also referred to as paths or links) in the radio interface between the user equipment 11 and the base station 12. The channels between the respective antennas of the user equipment and the base station are denoted $h_{i,j}$, where i=1, ..., N and j=1, ..., M in FIG. 1. The different channels $h_{i,j}$ may experience different radio conditions. In the example illustrated in FIG. 1 each transmit antenna $a_1, a_2, \ldots, a_N$ is provided with a separate power amplifier (PA), but depending on the type of transmit diversity technique to be applied it may also be possible to let several antennas share a PA.

The inventors of the present invention have recognized that, in a case of beamforming with a large difference between the transmit antennas $a_1, a_2, \ldots, a_N$, it is sub-optimal to transmit with equal power on all antennas. An inferior antenna will not lead to any substantial gain in received power but will instead produce a significant amount of interference for other users. This may reduce much of the gain that can be obtained by applying beamforming. If the gain difference between the antennas would be known, the effects caused by the differences could be accounted for in the beamforming algorithm.

In a case when each transmit antenna has a control channel (a DPCCH in HSPA), it is rather straight-forward to measure the received signal and estimate which of the antennas is inferior. However, for the case with only one shared DPCCH, the situation is more difficult.

One way to assess the long term gain difference would be by using downlink (DL) measurements and assuming that the difference seen in the downlink would mirror the gain difference in uplink (UL). However, measuring the DL channel only catches the slow varying fading, i.e. pathloss and shadow fading. The case with a moving user where the fast fading of the channel varies will not be caught. Also, the exemplary case with a stationary laptop where one of the antennas is in a fast fading dip, will not be caught by measuring the DL channel.

Embodiments disclosed herein propose to estimate the difference of the total channel gain for different antennas, reduce or adjust the transmission power on an inferior antenna.

A motivation for this is that the reduction of power on the inferior antenna will only lead to a slight reduction of received power at the base station (i.e. the Node B in a HSPA system) for this particular user and may be compensated for by power control. At the same time, the reduction of transmission power on the inferior antenna will reduce the particular UE's power consumption and most importantly, reduce the interference caused by the inferior antenna. Note that the inferior antenna may only be inferior for the received power from the particular user, it may still cause a lot of interference for other user equipments.

It can be expected that the antenna with the highest transmit power is the antenna that contributes the most to the received power at the base station in normal cases. Therefore any other antennas are expected to be inferior relative to the antenna with the highest transmit power.

The estimation of the channel gain difference for the different antennas is done by altering the transmit power of an inferior antenna during a transmit power adjustment phase. The effect of the altered power is seen in corresponding received TPC bits and depending on the outcome, the transmit power can be either reduced, increased or left unchanged according to different embodiments, which will be explained in further detail below.

Figure 2:
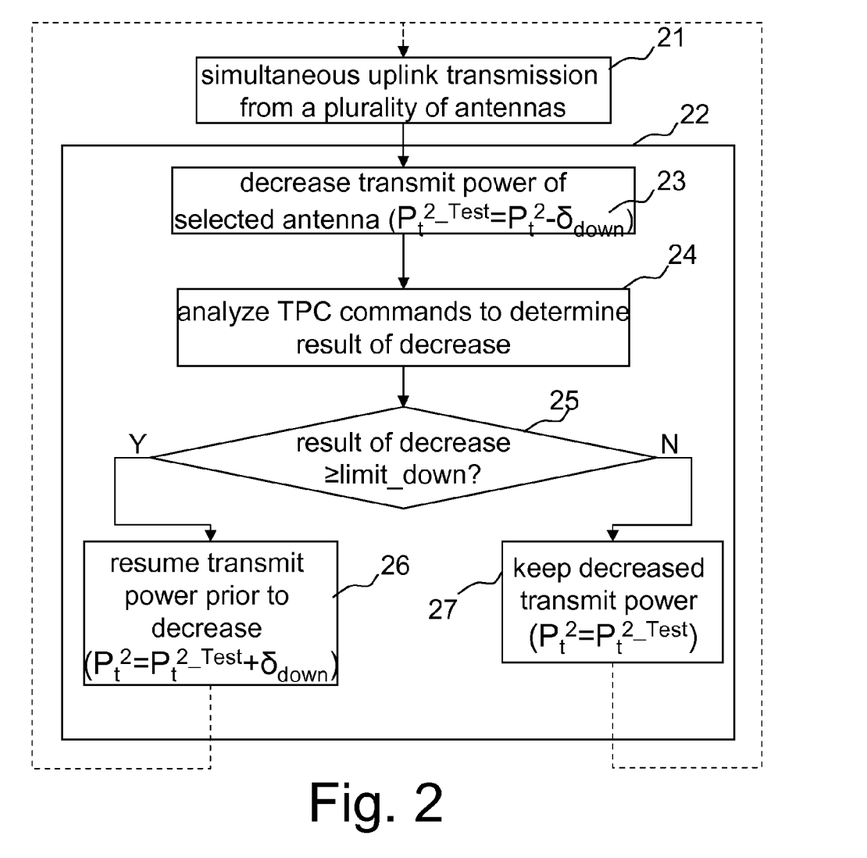
FIG. 2 is a flow diagram illustrating an embodiment of a method for transmit power adjustment in a user equipment.

FIG. 2 is a flow diagram illustrating an embodiment of a method for transmit power adjustment in the user equipment 11. In a step 21, simultaneous transmission from a plurality of antennas $a_1, a_2, \ldots, a_N$ is carried out. Thereafter a transmit power adjustment phase 22 is performed. During the transmit power adjustment phase 22, the transmit power of a selected one of the antennas is decreased by a selected decrease amount. In this exemplary embodiment it is assumed that the selected antenna is the antenna $a_2$, which is a secondary antenna that is suspected to be inferior relative to a primary antenna $a_1$ since the contribution to the received power at the base station 12 from the antenna $a_2$ is expected to be less than the contribution from the antenna $a_1$. The reason for this may be that the antenna $a_2$ has lower gain than the antenna $a_1$ or have worse channel conditions. It is further assumed that the selected decrease amount is $\delta_{down}$ dB. The decreased transmit power of antenna $a_2$ $P_t^{2\_Test}$ during the transmit power adjustment phase is thus $$P_t^{2\_Test} = P_t^2 - \delta_{down},$$

where $P_t^2$ is the transmit power of the antenna $a_2$ prior to the power adjustment phase.

In a step 23 a number of TPC commands, which are received in the user equipment, are analyzed. The TPC commands that are analyzed are expected to reflect a change in received power at the base station 12 as a result of the decreased transmit power of the selected antenna $a_2$. From the analysis of the TPC commands a result of the decreased transmit power of the selected antenna is determined, which indicates the change in received power at the base station. If for instance the TPC commands following the decreased transmit power of the selected antenna indicate that the transmit power should be raised considerably, this indicates that received power at the base station has become much worse. On the other hand if the TPC commands following the decreased transmit power of the selected antenna e.g. indicate that the transmit power should not be raised or raised by a minor amount, this indicates no or minor effects on the received transmit power at the base station as a result of the decreased transmit power of the selected antenna.

The result of the decreased transmit power may for instance be determined as the mean of the number of TPC commands in step 24, but it is also possible to use another function of the number of TPC commands as the result of the decreased transmit power. It is thereafter determined if the result of the decreased transmit power is higher than or equal to a predetermined decrease threshold value limit_down, in a step 25. If the determination in step 25 is affirmative, this indicates a significant undesired effect of the decreased transmit power. Therefore the transmit power prior to the decrease is resumed in a step 26. In this exemplary embodiment step 26 means that the transmit power of the antenna $a_2$ is increased with $\delta_{down}$ dB to resume the transmit power prior to the transmit power adjustment phase. If the determination in step 25 is negative, this indicates a minor acceptable effect of the decreased transmit power. Thus it is decided in a step 27 to keep the decreased transmit power after the completion of the transmit power adjustment phase. In this exemplary embodiment step 27 means that the transmission continues with the transmit power of the antenna $a_2$ equal to the decreased transmit power during the transmit power adjustment phase ($P_t^2 = P_t^{2-Test}$). The transmit power adjustment phase may optionally be repeated cyclically, which is illustrated with dashed arrows in FIG. 2.

Figure 3:
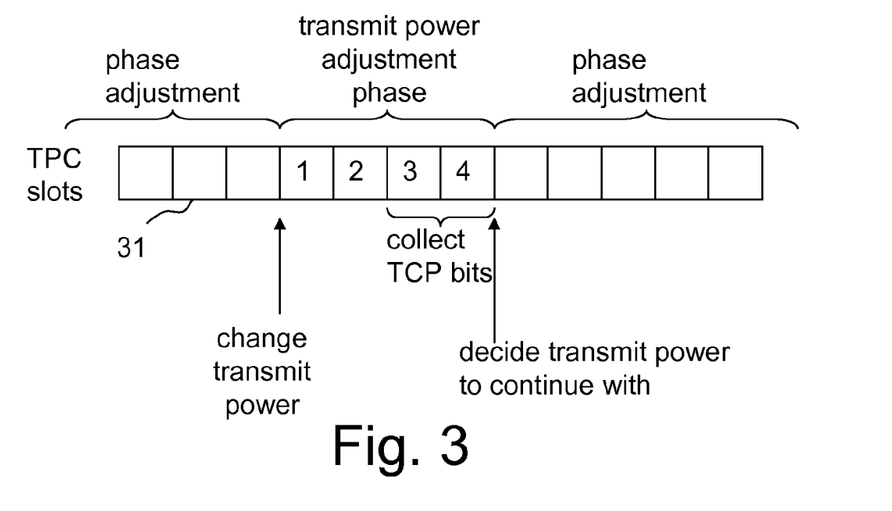
FIG. 3 is a schematic block diagram illustrating a part of an embodiment of a method for transmit power adjustment.

In order to isolate the effect of the decreased transmit power of the selected antenna during the transmit power adjustment phase, it may be beneficial to freeze any phase adjustments of the beamforming algorithm during the transmit power adjustment phase 22. FIG. 3 illustrates such a freezing of the phase during the transmit power adjustment phase. FIG. 3 illustrates a stream of TPC bits which are received in consecutive TPC slots 31. The transmit power adjustment phase in time and phase adjustment phases are illustrated. In practice, the phase adjustments phase would generally be longer than the transmit power phase. Beamforming phase adjustments are performed before and after, but not during a transmit power adjustment phase. The transmit power of the selected antenna is changed at the beginning of the transmit power adjustment phase and maintained during a measurement period. Since there is a certain delay in the reception of TPC bits it expected that a number of TPC bits received during the transmit power adjustment phase relates to the situation prior to the measurement period and thus may be "contaminated" by effects from previous phase adjustments. In the example illustrated in FIG. 3 it is expected that out of four TPC commands or bits that are received during the transmit power adjustment phase, the two first TPC commands relate to the situation prior to the measurement period, while the two last TPC commands relate to the measurement period. Therefore the two last TPC commands are collected and analyzed to determine the result of the changed transmit power of the selected antenna. Based on the determined result of the changed transmit power it is determined which transmit power to continue with upon completion of the transmit power adjustment phase. The phase adjustments are resumed again upon completion of the transmit power adjustment phase.

As mentioned above the transmit power adjustment phase which comprises a test to decrease the transmit power of a selected antenna may be repeated e.g. at cyclical intervals. If the transmit power of an antenna has been decreased, perhaps several times, it may be of interest to increase the transmit power of that antenna later on. Therefore a number of alternative ways of increasing the transmit power of a selected antenna are suggested according to different alternative embodiments presented herein.

One way of increasing the transmit power is to automatically increase the transmit power of the selected antenna by a selected increase amount (e.g. 1 dB) a certain period of time after completion of the transmit power adjustment phase 22 that included the test to decrease the transmit power. In most cases it would be a natural choice to only perform this increase if the transmit power of the selected antenna was actually decreased during the transmit power adjustment phase, since the overall aim is to keep the total transmit power down.

According to some embodiments the transmit power is only increased in cases where this has a relevant effect on the received power at the base station. A test similar to the decrease test described in connection with FIG. 2 and the transmit power adjustment phase 22 can be applied to test if it is beneficial to increase the transmit power. Thus the transmit power of an inferior antenna may be temporarily increased to an increase test level during a short measurement period. If the corresponding TPC commands indicate that the effective channel became better as a result of the increase, the previous transmit power of the selected antenna may be increased by a selected increase amount, e.g. 3 dB.

When performing an increase test as described above, it may be advantageous to raise the transmit power of the selected antenna considerably. The reason is that once the power of the selected antenna has been decreased sufficiently, so that it has a much lower transmit power than another antenna used simultaneously for beamforming, the effect of increasing or decreasing the transmit power from this level is difficult to detect since the power already is so low. However, if the increase during the measurement period raises the transmit power of the selected antenna to e.g. the same level as the transmit power of the antenna that currently has the highest transmit power, the effect of the increase can be detected. Thus the increased test level may be determined to be a level that guarantees that the effect of the increase can be detected. At the same time if it is determined as a result of the increase test that the transmit power should be increased compared to the transmit power prior to the increase test, the selected increase amount can be a smaller increase of e.g. a few dB. Thus, even though the transmit power may have been raised to a very high level during the test, the increased transmit power level that is maintained after and as a result of the increase test may be much lower than transmit power during the increase test.

Figure 4:
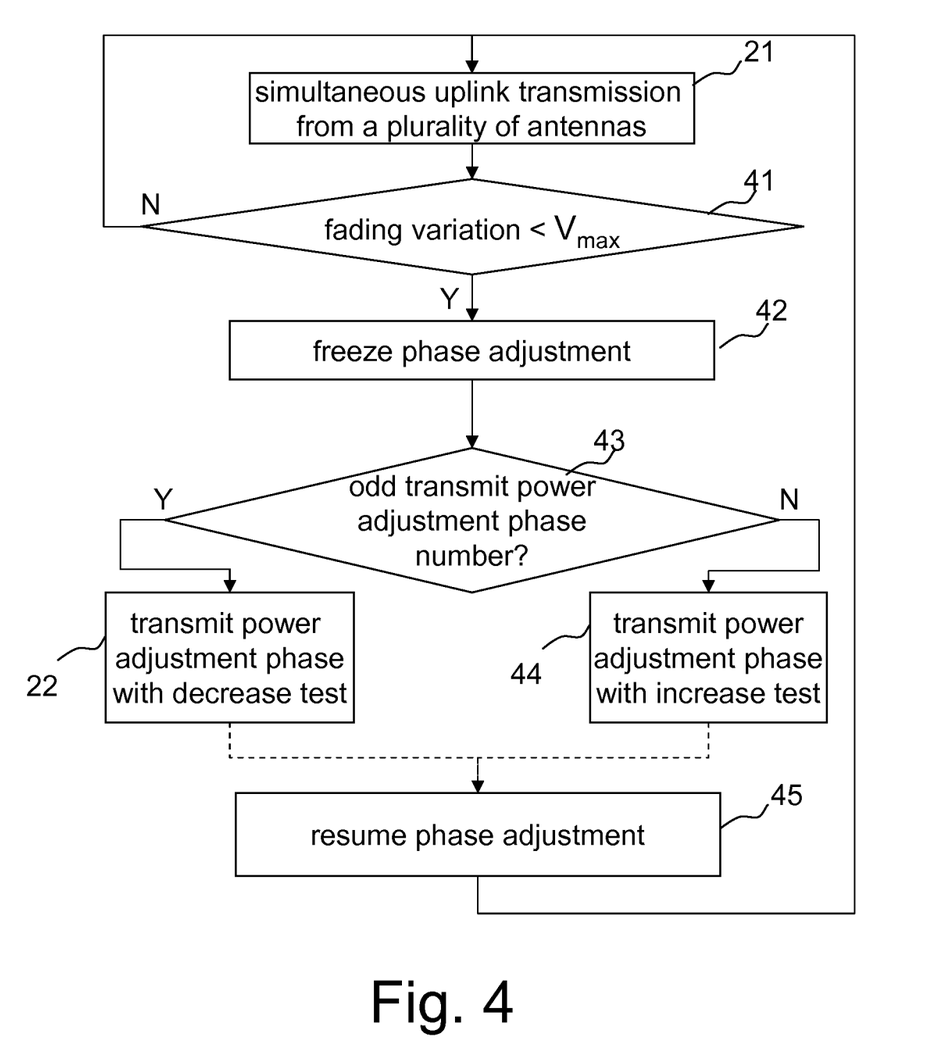
FIG. 4 is a flow diagram illustrating an alternative embodiment of a method for transmit power adjustment in a user equipment.

The above described tests to decrease or to increase the transmit power of a selected antenna may be performed cyclically and alternately during different transmit power adjustment phases. FIG. 4 illustrates such an embodiment. FIG. 4 is a flow diagram of a method for transmit power adjustment in a user equipment. The method in FIG. 4 starts with beamforming transmission, i.e. simultaneous transmission form a plurality of antennas of the user equipment, in a step 21. A transmit power adjustment phase with a decrease test, step 22, is performed alternately with a transmit power adjustment phase with an increase test, step 44. In the embodiment disclosed in FIG. 4 the tests to decrease or increase are performed interchangeably, every second test by checking a transmit power adjustment phase number in a step 43. If the transmit power adjustment phase number is odd, the decrease test is performed, and if the number is even the increase test is performed. Other embodiments may apply different criteria for determining which test to perform and may use a different distribution between the decrease and increase tests, e.g. two consecutive decrease tests followed by one increase test.

In the embodiment illustrated in FIG. 4 beamforming phase adjustments are freezed during any transmit power adjustment phase, step 42, and then resumed after the completion of the transmit power adjustment phase, step 45.

It is also illustrated in FIG. 4 that the method includes a step 41 in which the variation of the fading is analyzed to determine if the fading is above a predetermined limit, $V_{max}$. This is an optional step that is performed in this particular embodiment to give an indication of whether it is a suitable time or not for a transmit power adjustment phase. It may be advantageous to perform the transmit power adjustment phases when the fading is relatively constant. This would ensure that the result of the decrease or increase test is not contaminated by effects of fading. Thus, when to do transmit power adjustment phase may be decided by measuring and estimating fading a number of slots prior to the transmit power adjustment phase. TPC commands can also be analyzed to give an indication of whether the fading is relatively constant. If the average of the TPC bits (coded as 1 and −1) is close to −1, this indicates that the fading is increasing (approaching a peak). If the average of the TPC bits is close to 1, this indicates that the fading is decreasing (approaching a dip). If the average of the TPC bits is close to zero this implies that the fading is relatively constant. There are several known ways of measuring or estimating fading which could be used in the step 41 to determine if the fading is constant enough for it to be an appropriate time for a transmit power adjustment phase.

Figure 5:
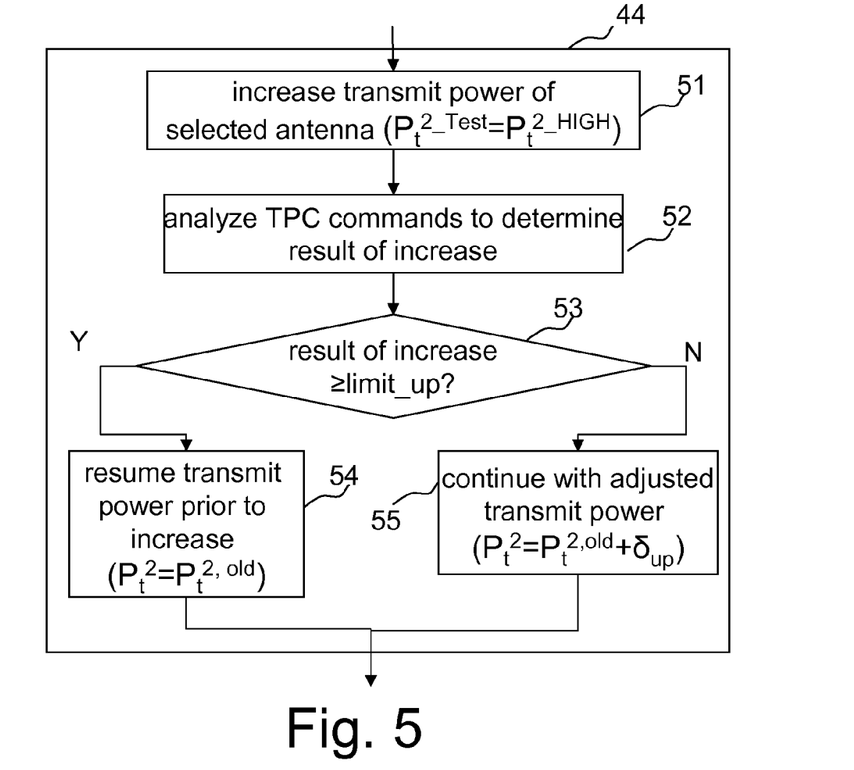
FIG. 5 is a flow diagram illustrating an exemplary embodiment of one of the method steps illustrated in FIG. 4.

FIG. 5 is a flow diagram illustrating an exemplary embodiment of step 44 in FIG. 4, i.e. an exemplary embodiment of a transmit power adjustment phase with an increase test. It is assumed here that that the selected antenna is antenna $a_2$ of FIG. 1. In a step 51 the transmit power of the selected antenna (here the antenna $a_2$) is increased to an increased test level $P_t^{2\_HIGH}$. The increased transmit power of antenna $a_2$ $P_t^{2\_Test}$ during the transmit power adjustment phase is thus $$P_t^{2\_Test} = P_t^{2\_HIGH}.$$

In a step 52 a number of TPC commands, which are received in the user equipment are analyzed. The TPC commands which are analyzed are expected to reflect a change in received power at the base station 12 as a result of the increased transmit power of the selected antenna $a_2$. From the analysis of the TPC commands a result of the increased transmit power of the selected antenna is determined, which indicates the change in received power at the base station. If for instance the TPC commands following the increased transmit power of the selected antenna indicate that the transmit power should be lowered considerably, this indicates that received power at the base station has become much better. On the other hand if the TPC commands following the increased transmit power of the selected antenna e.g. indicate that the transmit power should not be lowered or lowered by a minor amount, this indicates no or minor effects on the received transmit power at the base station as a result of the increased transmit power of the selected antenna.

The result of the increased transmit power may for instance be determined as the mean of the number of TPC commands in the step 52, but it is also possible to use another function of the number of TPC commands as the result of the increased transmit power. It is thereafter determined if the result of the increased transmit power is higher than or equal to a predetermined increase threshold value limit_up, in a step 53. If the determination in step 53 is affirmative, this indicates no or a very little effect of the increased transmit power. Therefore the transmit power prior to the increase, $P_t^{2,old}$, is resumed in a step 54. If the determination in step 53 is negative, this indicates a significant effect of the increased transmit power. Thus it is decided in a step 55 to increase the transmit power prior to the increase, $P_t^{2,old}$ by a selected increase amount, $\delta_{up}$ after the completion of the transmit power adjustment phase.

An exemplary embodiment of an algorithm for transmit power adjustment of a user equipment with a first antenna and a second antenna will now be explained below. It is assumed that the second antenna is the inferior antenna. Let $P_t^1$ and $P_t^2$ be the power at time t on the first and second antenna, respectively. As the algorithm runs, $P_t^2$ will be adjusted compared to $P_t^1$. The aim is to adjust $P_t^2$ down if this does not deteriorate the received power at the base station too much. $P_t^1$ and $P_t^2$ are controlled simultaneously, e.g. a TPC power up command will increase both power levels by 1 dB. Further, define $P^2_{min}$ and $P^2_{max}$ as the minimum and maximum allowed power on the second antenna. Further, assume that $P^2_{max} = P_t^1$ (in this exemplary algorithm the second antenna is not allowed to have higher power than the first antenna). When the algorithm starts, $P_t^1 = P_t^2$ and TPCmean=0.

Algorithm:

1. At each transmit power adjustment phase, test the $2^{nd}$ antenna.
   a. Turn off phase adjustments during the transmit power adjustment phase
   b. IF ODD transmit power adjustment phase number:
      i. Test to decrease $P_t^2$ relative to $P_t^1$
      ii. $2^{nd}$ antenna tested by decreasing transmit power on $2^{nd}$ antenna as $P_t^{2\_Test} = P_t^2 - \delta_{down}$
      iii. Keep the decreased transmit power during measurement period
      iv. Await delayed TPC command(s) corresponding to this measurement period, and calculate:

$$TPCmean = \sum_{i=bits} TPC_i$$

Comment: TPCmean represents in some sense the total loss in received power due to the power decrease of $2^{nd}$ antenna.
      v. IF TPCmean > limit_down (effect of lowering power)
         Resume previous $P_t^2 = P_t^{2\_Test} + \delta_{down}$ (no change of power)
      vi. ELSE if TPCmean < limit_down (no effect of lowering power)
         Keep decreased power $P_t^2 = P_t^{2\_Test}$
      vii. END
   c. ELSE if EVEN transmit power adjustment phase number:
      i. Test to increase $P_t^2$
      ii. $2^{nd}$ antenna tested by setting transmit power on $2^{nd}$ antenna as: $P_t^{2\_Test} = P_t^1$, i.e. $2^{nd}$ antenna has equal power as $1^{st}$ antenna, during measurement period. The old transmit power is saved as: $P_t^{2,old} = P_t^2$.
      iii. Await delayed TPC command(s) corresponding to this measurement period, and calculate:

$$TPCmean = \sum_{i=bits} TPC_i$$

iv. IF TPCmean >= limit_up (no effect of increasing power)
         Keep old transmit power $P_t^2 = P_t^{2,old}$
      v. ELSE if TPCmean < limit_up (effect of increasing power)
         Increase transmit power:
         $P_t^2 = \min(P_t^1, P_t^{2,old} + \delta_{up})$
      vi. END
   d. END ODD/EVEN if case
2. Go to 1

Figure 8:
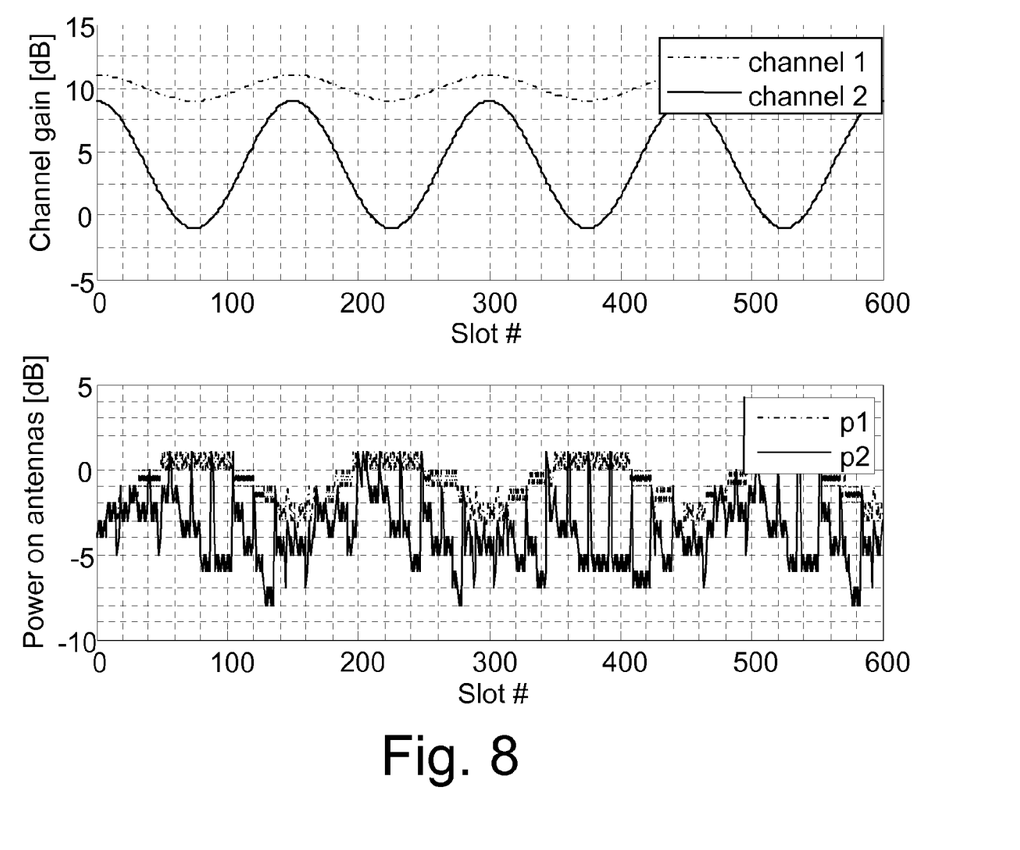
FIG. 8 includes diagrams illustrating power decrease obtained by implementation of an algorithm according to an embodiment, in case of a simple cosine channel gain for two antennas.

The algorithm under operation is depicted in FIG. 8, using a really simple cosine channel model. The upper diagram of FIG. 8 shows a simple cosine channel gain for the first antenna (channel 1) and the second antenna (channel 2). The lower diagram of FIG. 8 depicts the power decrease on the second antenna obtained by the algorithm. Note that the peaks in transmission power when testing for increasing power does not lead to power peaks in received power since the second antenna has a low gain in cases when the transmission power has large peaks.

From the above descriptions of different embodiments of methods for transmit power adjustment it is clear that there are several different ways in which the methods can be adapted for different implementations and application scenarios. A further example of an optional feature according to yet another exemplary embodiment is to collect and analyze TPC commands during a number N of measurement periods and thereafter make a decision on transmit power adjustment. The parameter N can be selected to give a test which is sensitive to relatively short term changes in antenna gains (by selecting a low value of N) or to only react on long term imbalances (by selecting a high value for N).

In some embodiments the power of selected antenna can be at most lowered to a predetermined minimum level relative to the transmit power of another antenna in order to avoid too large received power peaks.

The above mentioned decrease threshold value and increase threshold value are to be chosen based on how sensitive the test should be for altering the power of the selected antenna.

If the user equipment is provided with more than two antennas that are used for uplink beamforming, it is possible to perform transmit power adjustment phases selecting one of the inferior antennas at a time in turns. It is also possible to perform transmit power adjustment phases to test a set of antennas at a time. This might make sense if there is an antenna configuration which gives a dependence between several antennas, e.g. four antennas out of which a first and a second always have the same power and a third and a fourth always have the same power.

Figure 6:
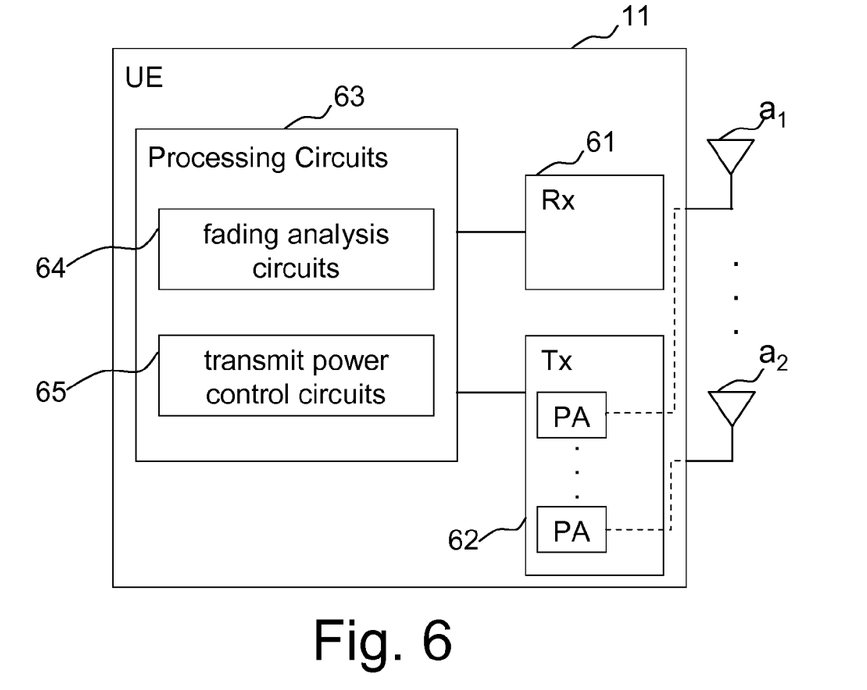
FIG. 6 is a schematic block diagram of an embodiment of a user equipment (UE) configured for beamforming and transmit power control.

FIG. 6 is a schematic block diagram of an exemplary embodiment of the UE 11 in FIG. 1. As illustrated in FIG. 6, the UE 11 comprises an antenna $a_1$ and an antenna $a_2$, but the UE 11 may also comprise further antennas. The UE includes receiver circuits 61 and transmitter circuits 62. Alternatively the receiver and transmitter circuits may be integrated in a transceiver unit. The transmitter circuits 62 and antennas $a_1$, $a_2$ are particularly configured to perform beamforming transmission as in the steps 21, 22 23, 26, 27, 44, 51, 54 and 55 of FIGS. 2, 4 and 5 respectively. Processing circuits 63 are provided, which optionally comprise fading analysis circuits for performing the optional step 41 of FIG. 4 and transmit power control circuits 65, adapted to perform or at least control the transmit power adjustment phases 22 and 44 of FIGS. 2, 4 and 5.

Figure 7:
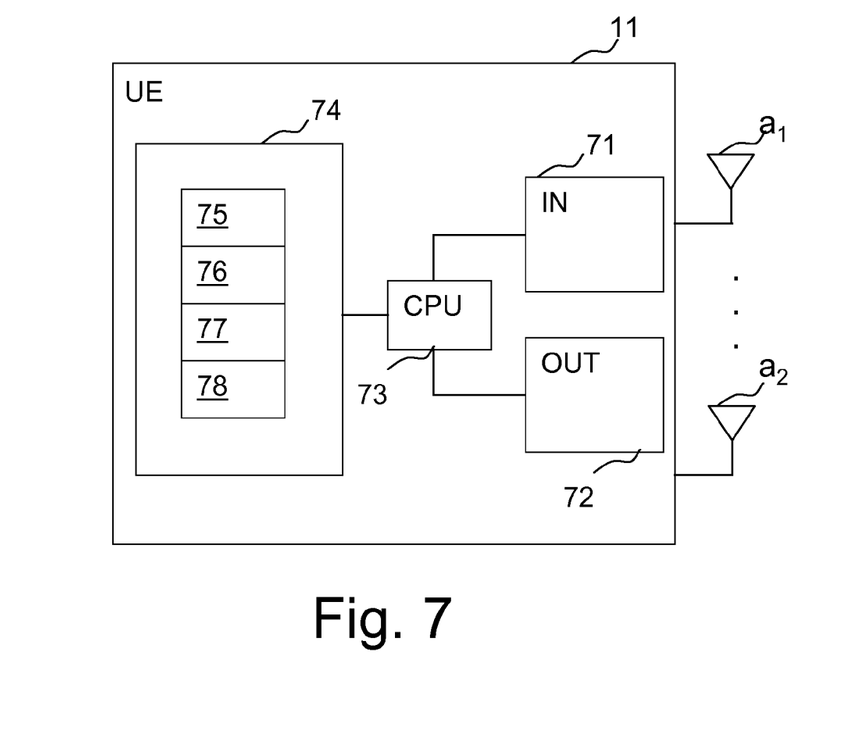
FIG. 7 is a schematic block diagram of an alternative embodiment of a user equipment configured for beamforming and transmit power control.

FIG. 7 is a schematic block diagram of another exemplary embodiment of the UE 11. FIG. 7 may be an alternative description of the exemplary embodiment shown in FIG. 6. The UE 11 comprises antennas $a_1$ and $a_2$. The UE also comprises an input unit 71 which is adapted to receive downlink signals, including e.g. TPC commands, and an output unit 72 for output of uplink signals. The input unit 71 and the output unit 72 may be integrated in hardware of the UE 11. The UE 11 is furthermore provided with a CPU 73, which may be a single unit or composed of several units that are configured to perform steps of procedures described herein. At least one computer program product 74 is included in the UE 11. The computer program product 74 may be embodied in the form of a non-volatile memory, e.g. an EEPROM, a flash memory or a disc drive. The computer program product 74 comprises computer program submodules. FIG. 7 shows a decrease test submodule 75 for performing a transmit power adjustment phase with a decrease test as in the step 22, an increase test submodule 76 for performing a transmit power adjustment phase with an increase test as in the step 44, a freeze phase adjustment submodule 77 for controlling the freezing of phase adjustments in the steps 42 and 45, and a fading analysis submodule 78 for performing the fading analysis of the step 41. The submodules 75-78 essentially perform the steps 22 and 41-45 of the flow diagrams of FIG. 2 or 4. In other words, when the different submodules 75-78 are run on the CPU 53, the UE performs the steps 22 and 41-45 illustrated in FIG. 2 or 4. The submodules 75-78 would generally be implemented in software, although implementations completely or partly in firmware, hardware or combinations thereof are also feasible.

From the description above it is apparent that an advantage of embodiments described above is that they may improve performance in a case of open-loop uplink beam forming when one of the antennas is inferior compared to another antenna, and still transmit the same amount of power on the inferior antenna. Also, in a case when the channel of one of the antennas is much worse than the channel of another antenna, it is not optimal to transmit equal power on both antennas. The embodiments presented herein may be used to optimize the power usage of the user equipment in case of an inferior antenna and/or differing channel conditions. In cases with power amplifiers for each antenna, this will reduce the interference from the user equipment and thereby increase capacity. If the UE has one common power amplifier it is also possible to gain in coverage with this invention.

Figure 9:
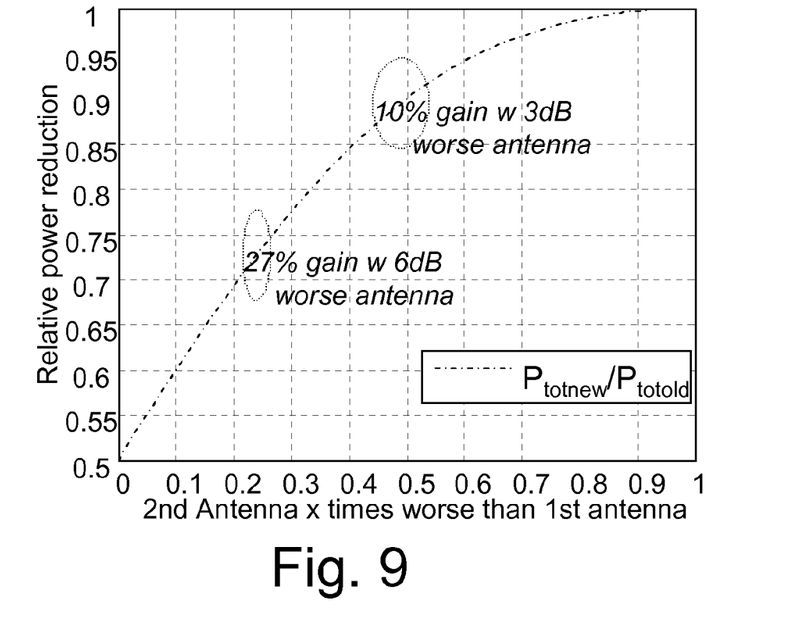
FIG. 9 is a diagram illustrating reductions in power usage that may be achieved by implementing embodiments of the present invention.

FIG. 9 is a diagram that illustrates that lowering the power on a second antenna which is inferior relative to a first antenna (and still maintaining the SIR target at the base station), can lead to relatively large reductions in power usage (and hence interference reduction). As seen from FIG. 9, a 3 dB antenna difference lowers the used transmit power by 10%, and a 6 dB difference lowers used power by 27%. Note that these calculations are without taking fast fading into consideration.

Another advantage of the above described embodiments is that they make use of already existing feedback information, namely TPC commands, to determine if the transmit power of the selected antenna should be adjusted. Thus the above described embodiments do not require any new type of feedback information. The TPC commands are transmitted for other purposes, but can be interpreted and used in other ways than originally intended as described above.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for transmit power adjustment in a user equipment of a wireless communications system, the method comprising:

performing uplink transmission by means of beamforming, such that simultaneous uplink transmission from a plurality of antennas of the user equipment is carried out, and performing a first transmit power adjustment phase, comprising:

decreasing the transmit power of a selected antenna by a selected decrease amount during a first measurement period, wherein the transmit power of the selected antenna prior to the decrease was lower than or equal to the transmit power of another antenna of the plurality of antennas;

analyzing a plurality of transmit power control (TPC) commands corresponding to the first measurement period to determine a result of the decreased transmit power of the selected antenna as indicated by a change in received power at a base station;

completing the first transmit power adjustment phase by selectively (i) resuming the transmit power of the selected antenna prior to the decrease if the result of the decreased transmit power is above or equal to a decrease threshold value or (ii) continuing the uplink transmission with the decreased transmit power of the selected antenna if the result of the decreased transmit power indicates a change in received power at the base station that is below the decrease threshold value.

2. The method of claim 1, further comprising freezing any beamforming phase adjustments of the uplink transmission during the first transmit power adjustment phase.

3. The method of claim 1, further comprising performing a second transmit power adjustment phase, wherein the second transmit power adjustment phase comprises:
   increasing the transmit power of the selected antenna to an increased test level during a second measurement period;
   analyzing a plurality of received TPC commands corresponding to the second measurement period to determine a result of the increased transmit power of the selected antenna as indicated by a change in received power at a base station; and
   completing the second transmit power adjustment phase by selectively (iii) resuming the transmit power of the selected antenna prior to the increase to the increased test level if the result of the increased transmit power is above or equal to an increase threshold value or (iv) continuing the uplink transmission with a transmit power of the selected antenna that is increased by a selected increase amount compared to the transmit power of the selected antenna prior to the second transmit power adjustment phase if the result of the increased transmit power is below the increase threshold value.

4. The method of claim 3, wherein said increased test level is substantially equal to the transmit power of said other antenna.

5. The method of claim 3, wherein the first and second transmit power adjustment phases are repeated cyclically and alternately.

6. The method of claim 1, further comprising increasing the transmit power of the selected antenna by a selected increase amount a period of time after completion of the first power adjustment phase.

7. The method of claim 6, wherein the first transmit power adjustment phase is repeated cyclically.

8. The method of claim 1, wherein the result of the decreased transmit power of the selected antenna is determined as a mean of said plurality of TPC commands.

9. The method of claim 1, wherein said first transmit power adjustment phase comprises a plurality of measurement periods during which the transmit power of the selected antenna is decreased by the selected decrease amount and wherein said result of the decreased transmit power is determined by analyzing a plurality of TPC commands corresponding to the plurality of measurement periods.

10. The method of claim 1, wherein the power of the selected transmit antenna is at most decreased to a predetermined minimum level relative to the transmit power of said other antenna.

11. The method of claim 1, further comprising performing fading analysis prior to the first transmit power adjustment phase to determine whether the variation of the fading is below a predetermined limit, and wherein the first transmit power adjustment phase is performed when it is determined that the fading is below the predetermined limit.

12. A user equipment for use in a wireless communication system, the user equipment comprising a plurality of antennas adapted for simultaneous uplink transmission and transmit power control circuits configured to control the transmit power of the plurality of antennas, wherein the transmit power control circuits are configured to perform a first transmit power adjustment phase that comprises:
   decreasing the transmit power of a selected antenna by a selected decrease amount during a first measurement period, wherein the transmit power of the selected antenna prior to the decrease was lower than or equal to the transmit power of another antenna of the plurality of antennas;
   analyzing a plurality of transmit power control (TPC) commands corresponding to the first measurement period to determine a result of the decreased transmit power of the selected antenna as indicated by a change in received power at a base station;
   completing the first transmit power adjustment phase by selectively (i) resuming the transmit power of the selected antenna prior to the decrease if the result of the decreased transmit power is above or equal to a decrease threshold value or (ii) continuing the uplink transmission with the decreased transmit power of the selected antenna if the result of the decreased transmit power indicates a change in received power at the base station that is below the decrease threshold value.

13. The user equipment of claim 12, wherein the transmit power control circuits are further configured to freeze any beamforming phase adjustments of the uplink transmission during the first transmit power adjustment phase.

14. The user equipment of claim 12, wherein the transmit power control circuits are further configured to perform a second transmit power adjustment phase that comprises:
   increasing the transmit power of the selected antenna to an increased test level during a second measurement period;
   analyzing a plurality of received TPC commands corresponding to the second measurement period to determine a result of the increased transmit power of the selected antenna as indicated by a change in received power at a base station; and
   completing the second transmit power adjustment phase by selectively (iii) resuming the transmit power of the selected antenna prior to the increase to the increased test level if the result of the increased transmit power is above or equal to an increase threshold value or (iv) continuing the uplink transmission with a transmit power of the selected antenna that is increased by a selected increase amount compared to the transmit power of the selected antenna prior to the second transmit power adjustment phase if the result of the increased transmit power is below the increase threshold value.

15. The user equipment of claim 14, wherein said increased test level is substantially equal to the transmit power of said other antenna.

16. The user equipment of claim 14, wherein the transmit power control circuits are configured to repeat the first and second transmit power adjustment phases cyclically and alternately.

17. The user equipment of claim 12, wherein the transmit power control circuits are configured to increase the transmit power of the selected antenna by a selected increase amount a period of time after completion of the first power adjustment phase.

18. The user equipment method of claim 17, wherein the transmit power control circuits are configured to repeat the first transmit power adjustment phase cyclically.

19. The user equipment of claim 12, wherein the transmit power control circuits are configured to determine the result of the decreased transmit power of the selected antenna as a mean of said plurality of TPC commands.

20. The user equipment of claim 12, wherein said transmit power control circuits are configured to perform a plurality of measurement periods during the first transmit power adjustment phase, during which plurality of measurement periods the transmit power of the selected antenna is decreased by the selected decrease amount, and wherein said transmit power control circuits are further configured to determine the result of the decreased transmit power by analyzing a plurality of TPC commands corresponding to the plurality of measurement periods.

21. The user equipment of claim 12, wherein the transmit power control circuits are configured to decrease the power of the selected transmit antenna at most to a predetermined minimum level relative to the transmit power of the first antenna.

22. The user equipment of claim 12, further comprising fading analysis circuits configured to perform fading analysis prior to the first transmit power adjustment phase to determine whether the variation of the fading is below a predetermined limit, and wherein the transmit power control circuits are configured to perform the first transmit power adjustment phase when it is determined that the fading is below the predetermined limit.

* * * * *